United States Patent [19]
Kotowski

[11] Patent Number: 5,247,561
[45] Date of Patent: Sep. 21, 1993

[54] LUGGAGE INSPECTION DEVICE

[76] Inventor: Andreas F. Kotowski, 2315 Sunnyside Ridge Rd., Rancho Palos Verdes, Calif. 90274

[21] Appl. No.: 636,626

[22] Filed: Jan. 2, 1991

[51] Int. Cl.⁵ ........................... G01N 23/201
[52] U.S. Cl. ........................ 378/87; 378/86; 378/88; 378/89
[58] Field of Search .......... 378/4, 6, 7, 19, 86–90, 378/901, 57

[56] References Cited

U.S. PATENT DOCUMENTS

| | | | |
|---|---|---|---|
| 4,384,209 | 5/1983 | Wagner et al. | 378/6 |
| 4,821,213 | 4/1989 | Cline et al. | 378/901 |
| 4,825,454 | 4/1989 | Annis et al. | 378/87 |
| 4,839,913 | 6/1989 | Annis et al. | 378/87 |
| 4,864,142 | 9/1989 | Gomberg | 378/57 |
| 4,870,670 | 9/1989 | Geus | 378/87 |
| 4,881,251 | 11/1989 | Nambu et al. | 378/4 |
| 4,905,265 | 2/1990 | Cox et al. | 378/19 |
| 4,956,856 | 9/1990 | Harding | 378/87 |

FOREIGN PATENT DOCUMENTS 2461877  7/1976  Fed. Rep. of Germany ........ 378/87

OTHER PUBLICATIONS

Edward C. Greenwald & Chester F. Poranski, Jr., Advancements in X-Ray Backscatter Tomography (for 1991 ASNT Spring Conference-Nondestructive Characterization for Advanced Technologies), Mar. 18, 1991, pp. 81–81.

*Primary Examiner*—David P. Porta
*Attorney, Agent, or Firm*—Lyon & Lyon

[57] ABSTRACT

The invention provides an inspection system for closed containers, such as luggage, which applies radiant energy, such as x-rays, to a container and receives energy which is scattered, such as by Compton scattering, by objects in the container. The received energy is measured and a three-dimensional image of the objects in the container is constructed. The container may be moved relative to a fan-shaped primary x-ray beam, which illuminates a single slice of the container at a time. For example, the container may be moved by a conveyer belt, or, the container may be held stationary while the x-ray tube may comprise a steerable beam. A plurality of collimated x-ray sensors may receive energy which is scattered, at a fixed angle for each sensor, and transmits those measurements to a processor which reconstructs the three-dimensional image and displays that image for an operator. The processor may also search for, and raise an alarm if it detects, a sufficient volume of material with a mass density indicative of an explosive.

22 Claims, 5 Drawing Sheets

LUGGAGE INSPECTION DEVICE

BACKGROUND OF THE INVENTION

1. Field of the Invention

This invention relates to inspection of luggage and other closed containers. More specifically, this invention relates to three-dimensional reconstruction of an image of the inside of closed containers, using scattering of x-rays or other radiant energy.

2. Description of Related Art

Inspection systems for luggage and other closed containers have been commonly used for detecting objects (such as bombs, explosives, weapons, and other contraband) which authorities desire to exclude from entry onto an airplane. Because there are typically very many parcals of luggage to inspect and little time with which to inspect them, these inspection systems must perform their task in a short time and without excessive invasion of the luggage. Existing systems have therefore concentrated on x-ray inspection by review of a projected x-ray image by a human operator.

The following U.S. Pat. Nos.: 4,242,583; 4,277,686; 4,366,382; 4,375,695; 4,495,636; 4,751,722; 4,799,247; 4,825,424; 4,839,913; 4,850,002; 4,870,670; 4,884,289; 4,887,285; and the following articles and books: Kotowski, "New X-Ray Technology to Meet Bomb Threats", Airport Forum, vol. XVII, no. 4 (April 1987); Roder, "Principles, History, and Status of Dual Energy Computerized Tomographic Explosives Detection", Journal of Testing and Evaluation, vol. 13, no. 3 (May 1985); C. Johns, THE PHYSICS OF RADIOLOGY (4th ed. 1983), published by Charles Thomas, comprise at least a partial description of the present state of the art, as known to the inventor.

One problem which has arisen in the art is that the projected x-ray image is only two-dimensional. The two-dimensional image only indicates explosives which may be present by image areas indicating the cumulative density of material which the projected x-ray passes through. While this method may be effective for detecting large solid easily-recognized objects, it is subject to the drawback that true volume density cannot be determined by a projection system; for example, a thin layer of dense material such as metal cannot be distinguished from a thick layer of light material such as clothing.

SUMMARY OF THE INVENTION

The invention provides an inspection system for closed containers, such as luggage, which applies radiant energy, such as x-rays, to a container and receives energy which is scattered, such as by Compton scattering, by objects in the container. The received energy is measured, and a three-dimensional image of the objects in the container is constructed.

In a preferred embodiment, the container may be moved relative to a fan-shaped primary x-ray beam, which illuminates a single slice of the container at a time. For example, the container may be moved by a conveyer belt, or, the container may be held stationary while the x-ray tube may comprise a steerable beam. A plurality of collimated x-ray sensors may receive energy which is scattered, at a fixed angle for each sensor, and transmits those measurements to a processor which reconstructs the three-dimensional image and displays that image for an operator. In a preferred embodiment, the processor may also search for, and raise an alarm if it detects, a sufficient volume of material with a mass density indicative of an explosive.

DESCRIPTION OF THE PREFERRED EMBODIMENT

Figure 1A:
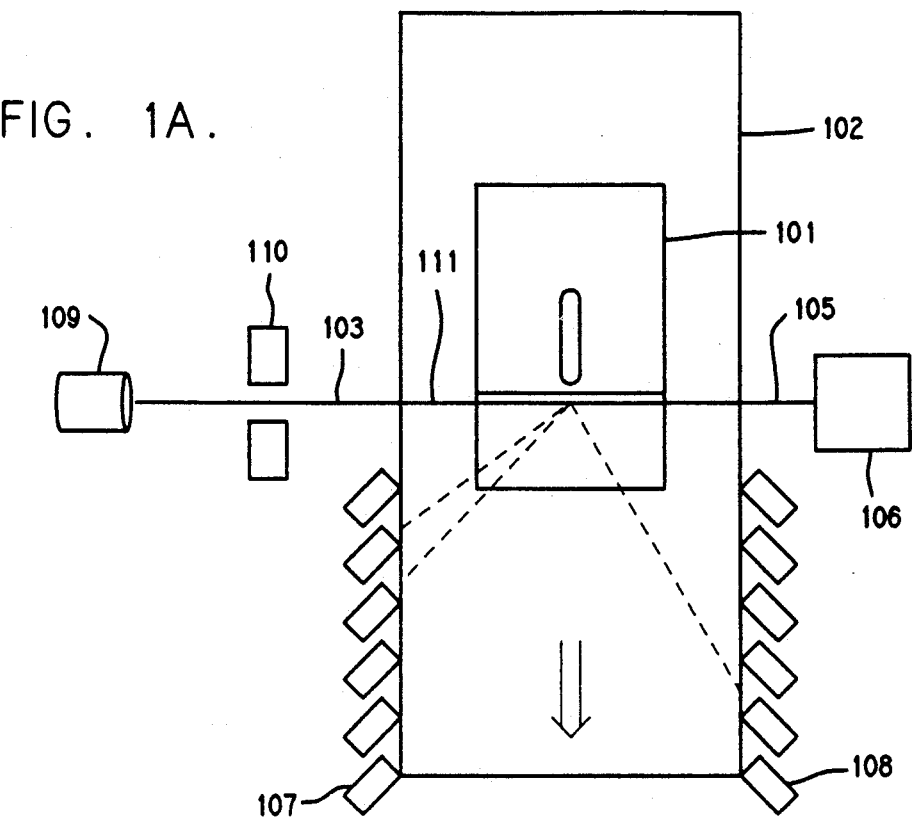
FIG. 1A shows a plan view.
Figure 1B:
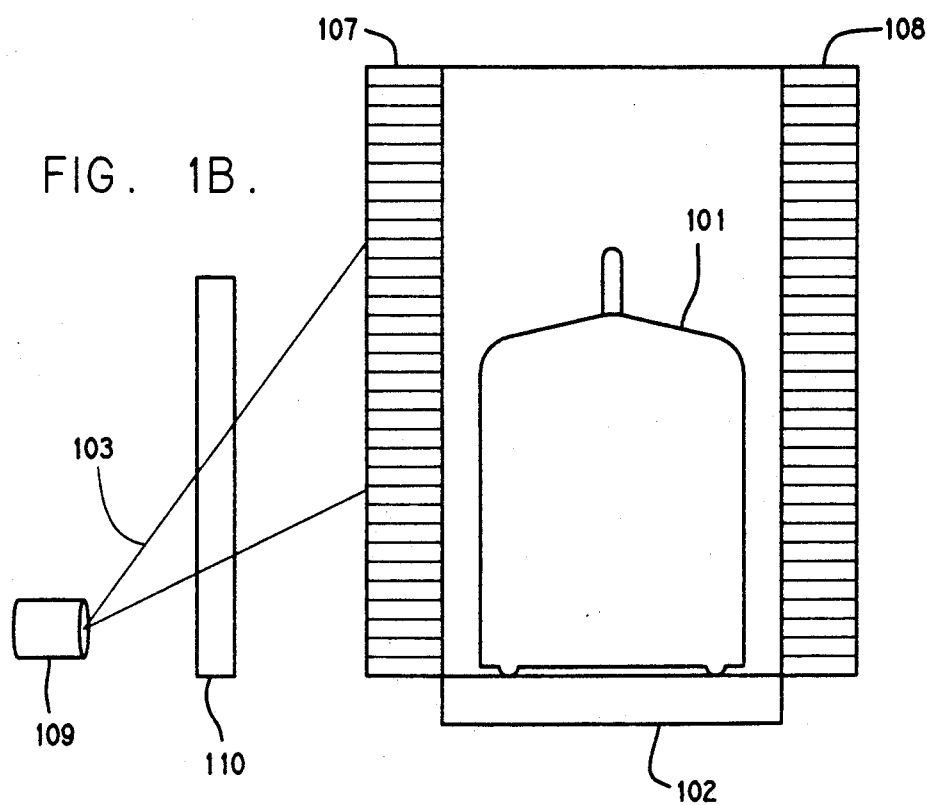
FIG. 1B shows a front view, of an embodiment of the invention.

FIG. 1A shows a plan view, and FIG. 1B shows a front view, of an embodiment of the invention.

A container 101 to be inspected is carried by a conveyer belt 102, which supports the container 101 and moves it past a fan-shaped x-ray beam 103. In a preferred embodiment, the x-ray beam 103 may make a right angle with the conveyer belt 102. However, it may be desirable in some embodiments to use an angle other than a right angle to allow inspection of leading, trailing, top and bottom sides of the container 101. The x-ray beam 103 penetrates the container 101, resulting in a scattered part 104 and a transmitted part 105. A transmission detector 106 detects the transmitted part 105 by any one of the projected x-ray techniques which are well known in the art. A set of backward scatter sensors 107 detect backscatter and a set of forward scatter sensors 108 detect forward scatter.

In a preferred embodiment, the x-ray beam 103 may comprise a collimated fan-shaped primary x-ray beam including an x-ray source 109 and a collimator 110, such as that shown in U.S. Pat. No. 4,366,382, hereby incorporated by reference as if fully set forth herein. As the container 101 moves through the x-ray beam 103, a successive set of slices 111 of the container 101 are penetrated and cause scattering.

Figure 1C:
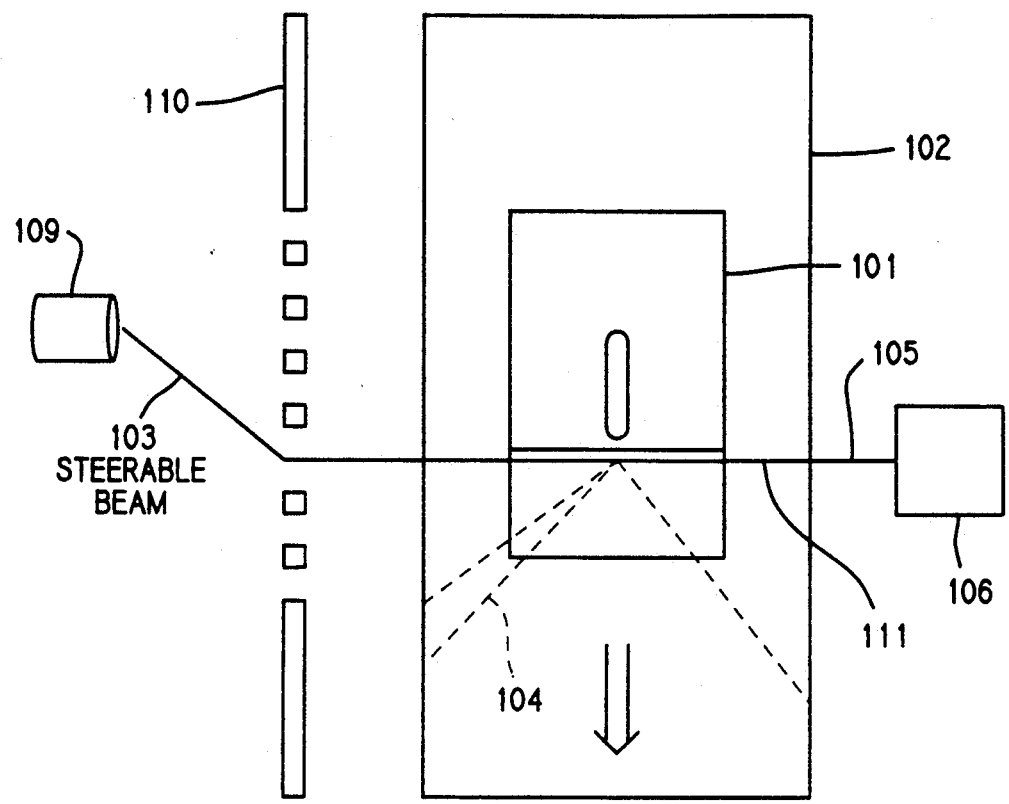
FIG. 1C shows an embodiment in which a CRT-type x-ray tube is used.

However, it may be desirable in some embodiments to hold the container 101 stationary while the x-ray beam 103 may be steerable. For example, an x-ray tube comprising CRT-type technology may be used, in which an electronically steerable electron beam may be directed to one of a plurality of spots on a CRT screen so as to select one of a plurality of x-ray beam 103 directions. FIG. 1C shows an embodiment in which a CRT-type x-ray tube is used.

Theory of Operation

In a preferred embodiment, the primary scattering mode is Compton scattering. It is well known in the art that Compton scattering of x-rays in a volume is proportional to electron density in that volume. Electron density is itself proportional to mass density, except for hydrogen. Thus, the three-dimensional image which is reconstructed is an image of Compton scattering density, an image which is quite close to an image of mass density.

It is well known in the art that explosives generally have a mass density between about 1.2 and 1.8 grams per cubic centimeter ($g/cm^3$). In contrast, bulk materials found in luggage, clothing, liquids, paper, and the like generally have a mass density less than about 1 $g/cm^3$; structural materials in luggage generally have a mass density more than about 2 g/cm$^3$; glass generally has a mass density between about 2 g/cm$^3$ and about 5 g/cm$^3$; aluminum has a mass density about 2.7 g/cm$^3$; and iron has a mass density about 7.8 g/cm$^3$. Plastic materials often do have a mass density between about 1 g/cm$^3$ and about 2 g/cm$^3$, but some manufactured plastic products have very thin wall sections to minimize cost and weight, and thus may be recognized easily by their three-dimensional shape.

The physics of Compton scattering is well known in the art and is well-described in the literature. See, e.g. C. Johns, THE PHYSICS OF RADIOLOGY (4th ed. 1983), published by Charles Thomas, hereby incorporated by reference as if fully set forth herein.

X-ray Beam and Sensor Array

Figure 2:
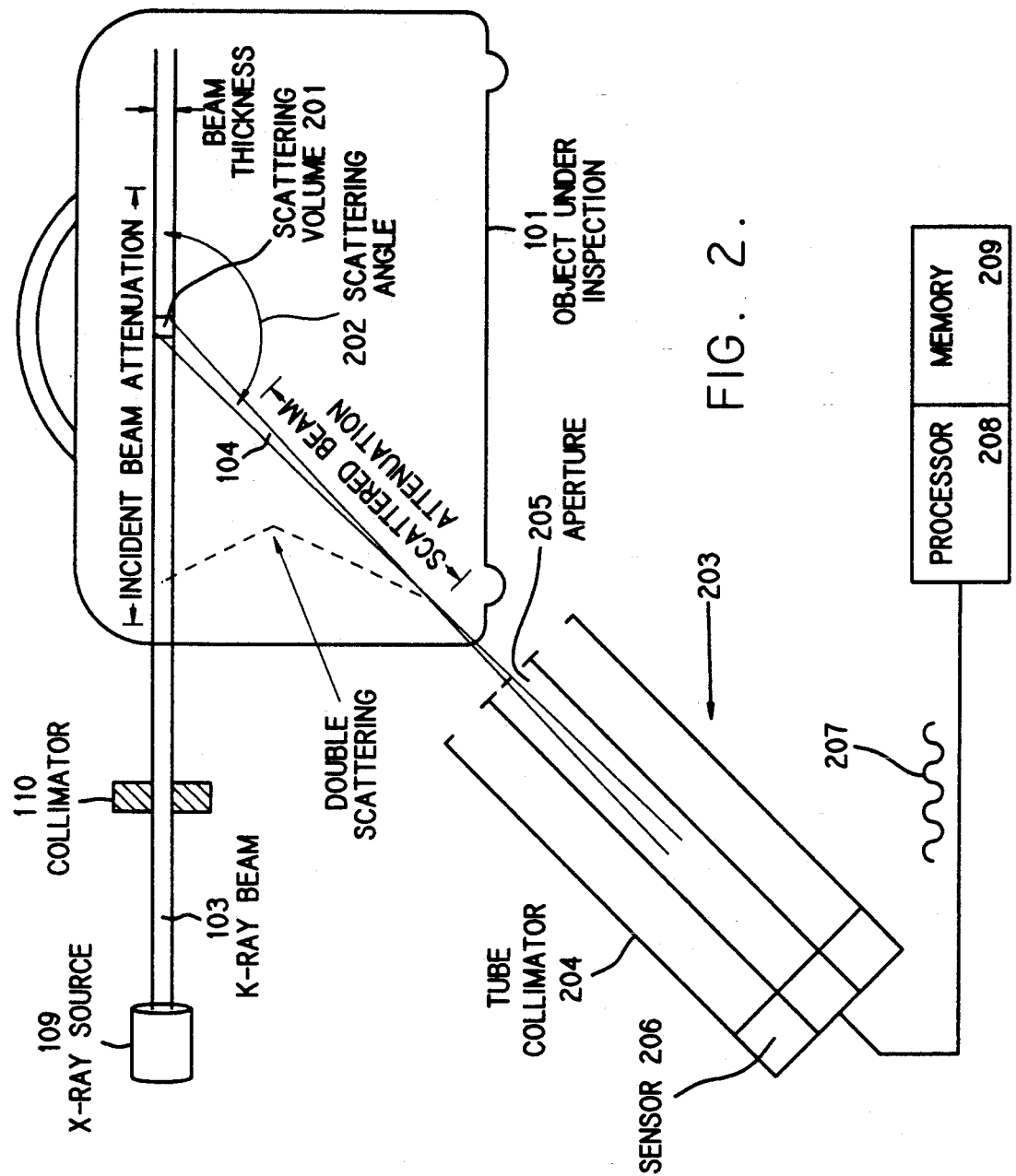
FIG. 2 shows a detailed view of an incident x-ray beam and a sensor for scattered energy.

FIG. 2 shows a detailed view of an incident x-ray beam and a sensor for scattered energy.

The x-ray source 109 generates the x-ray beam 103, which passes through the collimator 110 and penetrates the container 101 until it reaches a scattering volume 201. Scattering occurs in the scattering volume 201, and the scattered part 104 is directed at a scattering angle 202 toward an x-ray sensor 203, which may be one of the backward scatter sensors 107 or one of the forward scatter sensors 108. In a preferred embodiment, the x-ray sensor 203 may comprise a plurality of tube collimators 204, disposed in a shape like a collection of straws, with a set of corresponding collimator apertures 205 and tube sensors 206. In a preferred embodiment, the tube sensors 206 may each comprise a proportional x-ray detector, such as a scintillator coupled to a photodetector, or such as an ionization chamber. These types of sensors are well known in the art.

The x-ray beam 103 is attenuated by materials in the container 101 between the x-ray source 109 and the scattering volume 201; this is called "incident beam attenuation" herein. The scattered part 104 is attenuated by materials in the container 101 between the scattering volume 201 and the x-ray sensor 203; this is called "scattered beam attenuation" herein.

The x-ray sensor 203 generates a signal 207 indicating the amount of x-ray energy which is scattered into it. Thus, after incident beam attenuation, after scattering, and after scattered beam attenuation, the signal 207 from each x-ray sensor 203 is collected by a processor 208, which computes the density of each scattering volume 201 in the container 101.

Double scattering of x-ray photons will be minimal. Moreover, double scattering may also be accounted for by the processor 208 in its method of computing a three-dimensional density image.

X-ray Beam Energy

Compton scattering is the dominant mode of interaction between the x-ray beam 103 and the container 101 when the x-ray beam 103 energy is between about 150 thousand electron volts (Kev) and about 4 million electron volts (Mev). However, the scattered part 104 energy is less than the primary x-ray beam 103 energy. If the forward scatter sensors 108 are placed at a 45 degree angle, the primary x-ray beam 103 energy must be about 165 Kev for the scattered part 104 energy to be about 150 Kev. If the backward scatter sensors 107 are placed at a 135 degree angle, the primary x-ray beam 103 energy must be about 300 Kev for the scattered part 104 energy to be about 150 Kev.

If the primary x-ray beam 103 energy is less than about 500 Kev, materials with high atomic number (Z), such as tin (Sn, Z=50), tungsten (W, Z=74) or lead (Pb, Z=82) may be used for good x-ray collimators, as photoelectric effect attenuation will be dominant.

Accordingly, in a preferred embodiment, the primary x-ray beam 103 energy may be between about 300 KeV and about 500 Kev, although a much wider range of energy is workable and is within the spirit and scope of the invention. For example, it is also possible to make the primary x-ray beam 103 energy lower, such as between about 50 Kev and about 150 Kev. In that case Compton scattering will dominate for lower Z materials, i.e., those with Z less than about 10. Higher Z materials may then be detected separately.

Forward and Backward Scatter Sensors

The forward scatter sensors 108 are disposed with one sensor for each resolution element to be imaged. In a preferred embodiment, each resolution element is sized between about 0.25 cm$^3$ and about 2 cm$^3$. However, large resolution elements reduce the capability of detecting small amounts of explosives; small resolution elements require a large number of sensors, each of which may have only a few photons to detect. Therefore, in a preferred embodiment, each resolution element is sized between about 0.5 cm$^3$ and about 1 cm$^3$.

For example, with a conveyer belt 102 width of about 50 cm and the resolution elements each about 0.5 cm$\times$0.5 cm, about 100 backward scatter sensors 107 and forward scatter sensors 108 are required to image a single plane of the container 101. If the container 101 is about 70 cm tall, about 140 planes, each 100 sensors, are required.

Moreover, the speed of the conveyer belt 102 may be varied to allow for greater resolution when desired by a human operator. For example, a button or switch pressed by the operator may slow the conveyer belt 102, or the conveyer belt 102 may be slowed whenever the processor 208 signals an alarm which indicates the presence of explosive material.

It would be clear to one of ordinary skill in the art, after perusal of the specification, drawings and claims herein, that many different techniques for placement and use of the backward scatter sensors 107 and the forward scatter sensors 108 would be workable, and are within the scope and spirit of the invention. For example, the forward scatter sensors 108 may be supplemented by the backward scatter sensors 107, but this is not required, and either the backward scatter sensors 107 or the forward scatter sensors 108 may be dispensed with. Additional sensors may be placed above or below the conveyer belt 102, in front of or behind the primary set of sensors, or in such other and further locations from which they may be trained on the container 101.

It would also be clear to one of ordinary skill in the art, after perusal of the specification, drawings and claims herein, that multiple sensors may be directed at one resolution element for increased accuracy in measuring scattering from that resolution element, but this is not required. Alternatively, the sensors could be disposed so that the backward scatter sensors 107 measure only a portion of the container 101 closest to the x-ray source 109, while the forward scatter sensors 108 measure only a portion of the container 101 farthest from the x-ray source 109.

There are broad optimal angles for placement of the sensors. In a preferred embodiment, the backward scatter sensors 107 may be placed between about 110 degrees and about 150 degrees from the incident x-ray beam 103 and the forward scatter sensors 108 may be placed between about 10 degrees and about 60 degrees from the incident x-ray beam 103.

Processor Computing Method

Incident beam attenuation and scattered beam attenuation enhance the complexity of computing the density of each scattering volume 201. The processor 208 can simply measure the apparent density of each scattering volume 201 without regard to incident beam attenuation and scattered beam attenuation. This would produce a large set of measurements (the measured density of each scattering volume 201) describing an equally large number of independent variables (the actual density of each scattering volume 201). The processor 208 can then compute the density of each scattering volume 201 by solving a large set of simultaneous linear equations, but this may be difficult in practice.

In a preferred embodiment, the Computation which the processor 208 performs is simpler. As the container 101 passes by the x-ray beam 103, successive slices 111 of the container 101 are illuminated. For the first (i.e., forwardmost) slice 111 of the container 101, scattered beam attenuation is nil, because there is no physical obstruction to the scattered part 104 of the x-ray beam 103. Moreover, for the first (i.e., leftmost, when the x-ray beam 103 illuminates the container 101 from the left side) part of the first slice 111, incident beam attenuation is also nil, because there is no physical obstruction to the x-ray beam 103.

Accordingly, in a preferred embodiment, the processor 208 may compute a density image of the container 101 one slice 111 at a time. After the first slice 111 is computed, the processor 208 may compute each successive slice 111 by accounting for scattered beam attenuation through the (known) former slices 111. Moreover, the processor 208 may compute a density image of the first slice 111 (and also each successive slice 111) one scattering volume 201 at a time. After the first scattering volume 201 is computed, the processor 208 may compute each successive scattering volume 201 by accounting for the incident beam attenuation through the (known) former scattering volumes 201.

It would be clear to one of ordinary skill in the art, after perusal of the specification, drawings and claims herein, that the processor 208 need not compute the density image of the container 101 from the front. For example, the computation may begin at the end (after the container 101 has completely passed the x-ray beam 103), or from a side, or from any exposed spot, and may proceed iteratively to compute the scattering effect for each scattering volume 201 within the container 101. Moreover, more than one method of computing the density image may be used, and the different results checked against each other.

It would be clear to one of ordinary skill in the art, after perusal of the specification, drawings and claims herein, that the set of densities, when expressed in terms of the set of measurements, are a large number of simultaneous linear equations with an equal number of unknowns. (With M independent detectors for N slices 111 there are M x N measurements.) The processor 208 may alternatively compute the density image of the container 101 by simultaneously solving these equations. However, this method generally requires a great deal of processing power.

Double scattering may be accounted for as follows. An first-approximation density image may be computed, ignoring double scattering effects. Using the first-approximation density image, a second-approximation density image may be computed after estimating double scattering effects from the first-approximation density image and adjusting the density image accordingly. Successive approximations may be computed iteratively to a desired degree of accuracy.

In a preferred embodiment, the processor 208 may operate under software control in conjunction with a memory 209, as is well known in the art. Software to control the processor 208 may be stored in the memory 209 and accessed by the processor 208 during ordinary operation, as is well known in the art; calculated values may also be stored in the memory 209 and accessed by the processor 208 during ordinary operation, as is well known in the art. It would be clear to one of ordinary skill in the art, after perusal of the specification, drawings and claims herein, that modification of a processor of standard design (such as a microprocessor system) to perform the functions disclosed herein would be a straightforward task and would not require undue experimentation.

It would be clear to one of ordinary skill in the art, after perusal of the specification, drawings and claims herein, that the processor 208 may also examine the density image which it computes, so as to automatically determine if there are any explosives within the container 101. In a preferred embodiment, the processor 208 may search the density image for regions whose density is substantially between about 1.2 and 1.8 $g/cm^3$. If a sufficient Volume (or a sufficient mass) of material with a mass density indicative of an explosive, the processor 208 may indicate an alarm to that effect (such as by a light or buzzer), so that an operator may perform a more detailed inspection.

Reduced Number of Sensors

Figure 3:
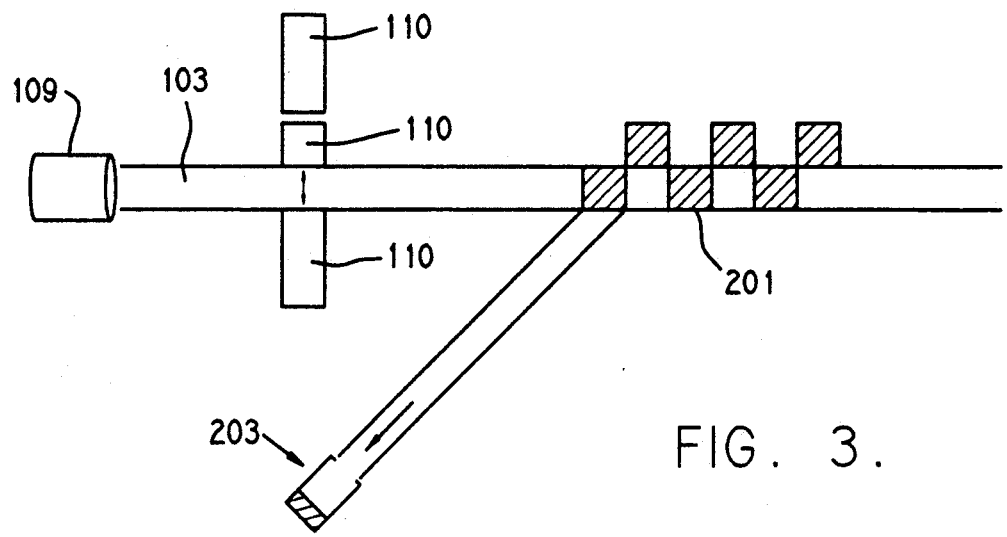
FIG. 3 shows an alternate embodiment of the invention which requires a lesser number of sensors.

FIG. 3 shows an alternate embodiment of the invention which requires a lesser number of sensors.

In an alternative embodiment, the x-ray source 109 generates a plurality of x-ray beams 103 and the collimator 110 is replaced with a movable collimator 301. The movable collimator 301 may be disposed to block all but one of the x-ray beams 103, and to move to allow each of the x-ray beams 103 to illuminate the container 101 in turn.

Each backward scatter sensor 107 and each forward scatter sensor 108 may then do multiple duty, once for each of the x-ray beams 103 which illuminate the container 101, as shown in FIG. 3. Accordingly, fewer sensors are required.

Figure 4A:
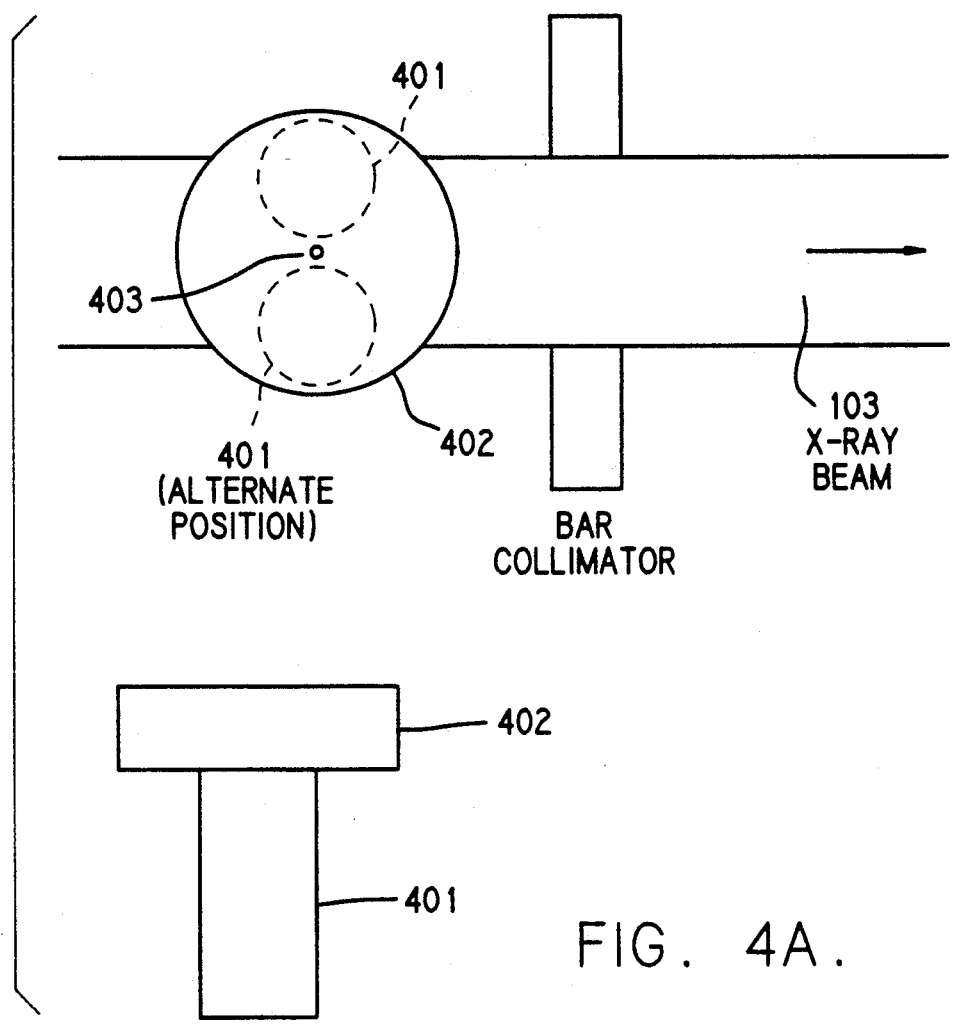
FIGS. 4A and 4B show x-ray collimators for the embodiment of the invention shown in FIG. 3.
Figure 4B:
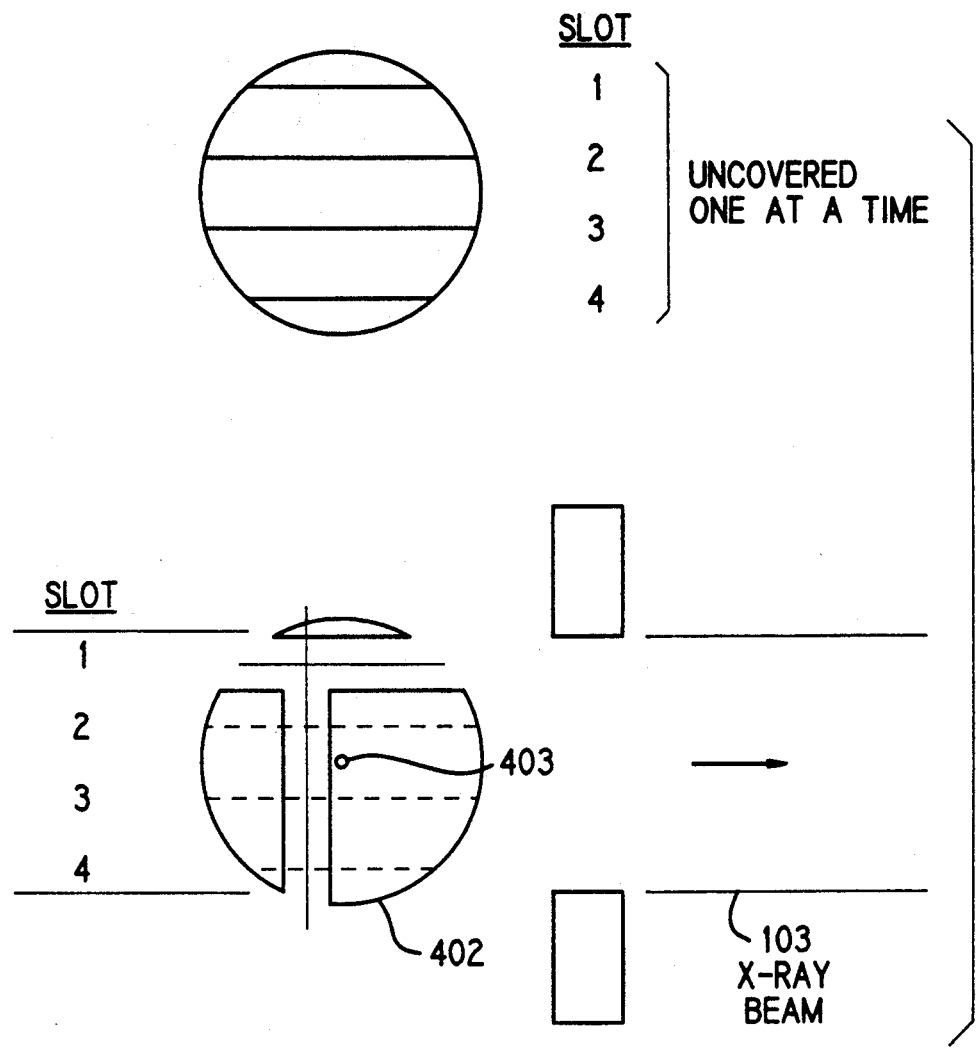

FIGS. 4A and 4B show x-ray collimators for the embodiment of the invention shown in FIG. 3.

The movable collimator 301 may comprise a collimator rod 401 attached to a drive wheel 402. The drive wheel 402 is rotated about an axis 403 so that the collimator rod 401 alternately allows passage of each x-ray beam 103 in a round-robin fashion. In a preferred embodiment, the collimator rod 401 may have two or four positions which allow full passage of one of the multiple x-ray beams 103.

Further information about x-ray collimators may be found in "Medical Physics Data Book", National Bureau of Standards 1982 Thomas Padikal, ed., hereby incorporated by reference as if fully set forth herein.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, it would be clear to one of ordinary skill in the art, after perusal of the specification, drawings and claims herein, that the invention may be used with differing types, or more than one type, of radiant energy, such as used in present dual-energy inspection devices.

It would also be clear to one of ordinary skill in the art that the x-ray source 109 and the sensors might be moved instead of moving the container 101. For example, the x-ray source 109 and the sensors might be swept in an arc around the container 101. Alternatively, the conveyer belt 102 may be controlled to account for the image of the container 101 which is detected. For example, if dense objects are detected, or if the operator desires greater sensitivity, the conveyer belt 102 may be slowed to allow more photons from the scattered part 104 of the x-ray beam 103 to be measured by the sensors.

It would be clear to one of ordinary skill in the art, that the size and shape of the backward scatter sensors 107 and the forward scatter sensors 108 may be varied. For example, those sensors which are close to the x-ray source 109 may be made smaller than those sensors which are far from the x-ray source 109. Moreover, the shape of the sensors determines the shape of the resolution elements. The sensors (and thus the resolution elements) may take on any cross-sectional shape; the sensors may be disposed so that the resolution elements overlap or are dispersed with some space in between.

It would also be clear to one of ordinary skill in the art that the invention may be used with a greater or lesser number of sensors, to achieve greater or lesser image resolution.

It would also be clear to one of ordinary skill in the art that the x-ray beam 103 need not be planar, and may take on the shape of any arbitrary surface, such as a conical frustrum or any similar shape. The x-ray beam 103 may even be shaped like a pencil-shaped beam, but in that case the sensors must be shaped to measure the scattered part 104 of the x-ray beam 103 in an entire plane (i.e., they must be shaped like slats in a set of window shades, but this requires more computation due to the larger number of scatter paths to the detector). More than one x-ray source 109 may be used.

It would also be clear to one of ordinary skill in the art that there are other applications of the invention, such as the following:

(1) inspection of luggage or other closed containers for alcohol, illegal drugs, or other contraband;
(2) inspection of closed containers to count, inventory or measure their contents, including fluid contents;
(3) inspection of finished goods for flaws, foreign objects, or gross damage; and
(4) inspection of vehicles for stowaways or other concealed persons.

Finally, it would be clear to one of ordinary skill in the art that the invention may be used in conjunction with and in addition to other and further methods of inspection, such as known projection x-ray systems.

I claim:

1. A device for inspecting a closed container, comprising
   means for applying radiant energy to a plurality of volume elements inside said closed container;
   a plurality of detectors, each associated with one of said plurality of volume elements, for receiving scattered energy therefrom, and for generating at least one measurement thereof; and
   means for processing said measurements and for generating a three-dimensional image of said volume elements.

2. A device as in claim 1, wherein said radiant energy comprises x-ray energy.

3. A device as in claim 1, wherein said radiant energy comprises electromagnetic energy including photons with energy between about 150 Kev and about 4 Mev.

4. A device as in claim 1, wherein said means for applying comprises a fan-shaped x-ray beam.

5. A device as in claim 1, wherein said scattered energy comprises energy scattered by Compton scattering.

6. A device as in claim 1, wherein said means for receiving comprises at least one collimated x-ray sensor.

7. A device as in claim 1, wherein said means for receiving comprises a plurality of sensors, each for sensing scattered energy from a separate volume of said container.

8. A device as in claim 1, comprising means for receiving transmitted energy from said closed container.

9. A device as in claim 1, wherein said means for applying radiant energy comprises a fan-shaped x-ray beam, whereby said plurality of volume elements lie in a plane; and wherein said plurality of detectors are disposed substantially parallel and at a predetermined angle from said plane, whereby said plurality of detectors generate a measure of scattered energy after incident beam attenuation and scattered beam attenuation.

10. A device as in claim 1, wherein said means for processing comprises means for correcting for incident beam attenuation and scattered beam attenuation.

11. A device for inspecting a closed container, comprising
    means for applying radiant energy to a plurality of volume elements deep inside said closed container;
    a plurality of detectors, each receiving scattered energy from one of said plurality of volume elements, for generating a measure of scattered energy after incident beam attenuation and scattered beam attenuation; and
    means for processing said measurements, for correcting for incident beam attenuation and scattered beam attenuation, and for generating a measure of density for each one of said volume elements.

12. A device for inspecting a closed container which is moving in a predetermined direction, comprising
    a fan-shaped radiant energy beam disposed at a first angle to said predetermined direction;
    a plurality of detectors, each disposed to receive energy scattered after incident beam attenuation and scattered beam attenuation, at a predetermined second angle to said predetermined direction, from a volume element deep inside said closed container; and
    means for processing said scattered energy, for correcting for said incident beam attenuation and scattered beam attenuation, and for generating a three-dimensional image of said volume.

13. A device for inspecting a closed container, comprising
- a conveyer belt;
- a fan-shaped x-ray beam disposed perpendicular to a direction of travel of said conveyor belt and disposed to illuminate a plurality of volume elements inside said container;
- a plurality of collimated x-ray sensors, each disposed to receive x-rays scattered from one of said plurality of volume elements at a predetermined angle; and
- a processor coupled to said plurality of collimated x-ray sensors.

14. A method of inspecting a closed container, comprising the steps of
- applying radiant energy to a plurality of volume elements inside said closed container;
- for each one of said plurality of volume elements, receiving scattered energy therefrom and generating at least one measurement thereof; and
- processing said measurements and generating a three-dimensional image of said volume.

15. A method as in claim 14, wherein said radiant energy comprises x-ray energy.

16. A method as in claim 14, wherein said radiant energy comprises electromagnetic energy including photons with energy between about 150 Kev and about 4 Mev.

17. A method as in claim 14, wherein said scattered energy comprises energy scattered by Compton scattering.

18. A method as in claim 14, comprising the step of receiving transmitted energy from said closed container.

19. A device for inspecting a closed container, comprising
- means for supporting said closed container and for moving said closed container substantially in a predetermined direction;
- a radiant energy beam disposed at a first angle to said predetermined direction;
- a plurality of sensors disposed to receive energy scattered from a plurality of volume elements inside said closed container at a plurality of differing second angles to said predetermined direction, each sensor being associated with one of said plurality of volume elements; and
- means for processing said scattered energy and for generating a three-dimensional image of said volume elements.

20. A device as in claim 19, wherein said means for supporting and for moving comprises a conveyor belt.

21. A device as in claim 19, wherein said first angle is a predetermined angle.

22. A device as in claim 19, wherein said first angle is about a right angle.

* * * * *